United States Patent
Kroeselberg

(10) Patent No.: US 9,307,402 B2
(45) Date of Patent: Apr. 5, 2016

(54) METHOD OF PROTECTING AN IDENTITY OF A MOBILE STATION IN A COMMUNICATIONS NETWORK

(75) Inventor: Dirk Kroeselberg, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 746 days.

(21) Appl. No.: 13/636,808

(22) PCT Filed: Mar. 25, 2010

(86) PCT No.: PCT/EP2010/053907
§ 371 (c)(1),
(2), (4) Date: Dec. 14, 2012

(87) PCT Pub. No.: WO2011/116821
PCT Pub. Date: Sep. 29, 2011

(65) Prior Publication Data
US 2013/0090087 A1 Apr. 11, 2013

(51) Int. Cl.
*H04M 1/66* (2006.01)
*H04W 12/02* (2009.01)
*H04L 29/06* (2006.01)
*H04W 84/12* (2009.01)

(52) U.S. Cl.
CPC ........... *H04W 12/02* (2013.01); *H04L 63/0407* (2013.01); *H04W 84/12* (2013.01)

(58) Field of Classification Search
CPC ..... H04W 36/00; H04W 12/02; H04W 84/12; H04W 80/04; H04L 29/06; H04L 63/04; H04L 63/0407; H04L 63/0892
USPC .............. 455/411; 370/474; 711/216; 712/14
See application file for complete search history.

(56) References Cited

U.S. PATENT DOCUMENTS

2004/0077341 A1* 4/2004 Chandranmenon ... H04W 36/14 455/418
2005/0283497 A1* 12/2005 Nurminen et al. ......... 707/104.1
(Continued)

FOREIGN PATENT DOCUMENTS

| EP | 2 053 801 A1 | 4/2009 |
| EP | 2053820 A1 | 4/2009 |
| EP | 2 104 307 A1 | 9/2009 |

OTHER PUBLICATIONS

IEEE C80216m-09_2322, Proposed Text for the IEEE P802.16m/D2 : AMS ID Privacy, Nov. 6, 2009, Chengyan Feng, ZTE Corporation, pp. 1-12.*

(Continued)

*Primary Examiner* — Mahendra Patel
(74) *Attorney, Agent, or Firm* — Harrington & Smith

(57) ABSTRACT

A method of protecting an identity of a mobile station in a communications network is provided, where the communications network includes an access node and a gateway node. The method includes receiving a first mobile station identifier value at the access node, storing the first value in the access node, receiving a second mobile station identifier value, correlating the second identifier value with the first identifier value in the access node, sending the first and second identifier values from the access node to the gateway node over an interface, storing the first identifier value and the second identifier value in the gateway node, and correlating the second identifier value with the first identifier value in the gateway node.

14 Claims, 1 Drawing Sheet

(56) References Cited

U.S. PATENT DOCUMENTS

| | | | |
|---|---|---|---|
| 2006/0120317 A1* | 6/2006 | Zheng | H04L 29/12216 370/315 |
| 2006/0274643 A1* | 12/2006 | Choyi | H04L 29/12009 370/216 |
| 2007/0026858 A1* | 2/2007 | Mizukoshi | H04W 88/06 455/426.1 |
| 2009/0313379 A1* | 12/2009 | Rydnell | H04L 63/0407 709/228 |
| 2011/0078443 A1* | 3/2011 | Greenstein et al. | 713/169 |

OTHER PUBLICATIONS

IEEE Std. 802.16/2009, © 2009 IEEE, Nov. 6, 2009, pp. 2-6.

Tsagkaris K., et al., "WiMax Network, Overview and Challenges Beyond the Air Interface", Jun. 2009, IEEE Vehicular Technology Magazine, 13 pgs.

* cited by examiner

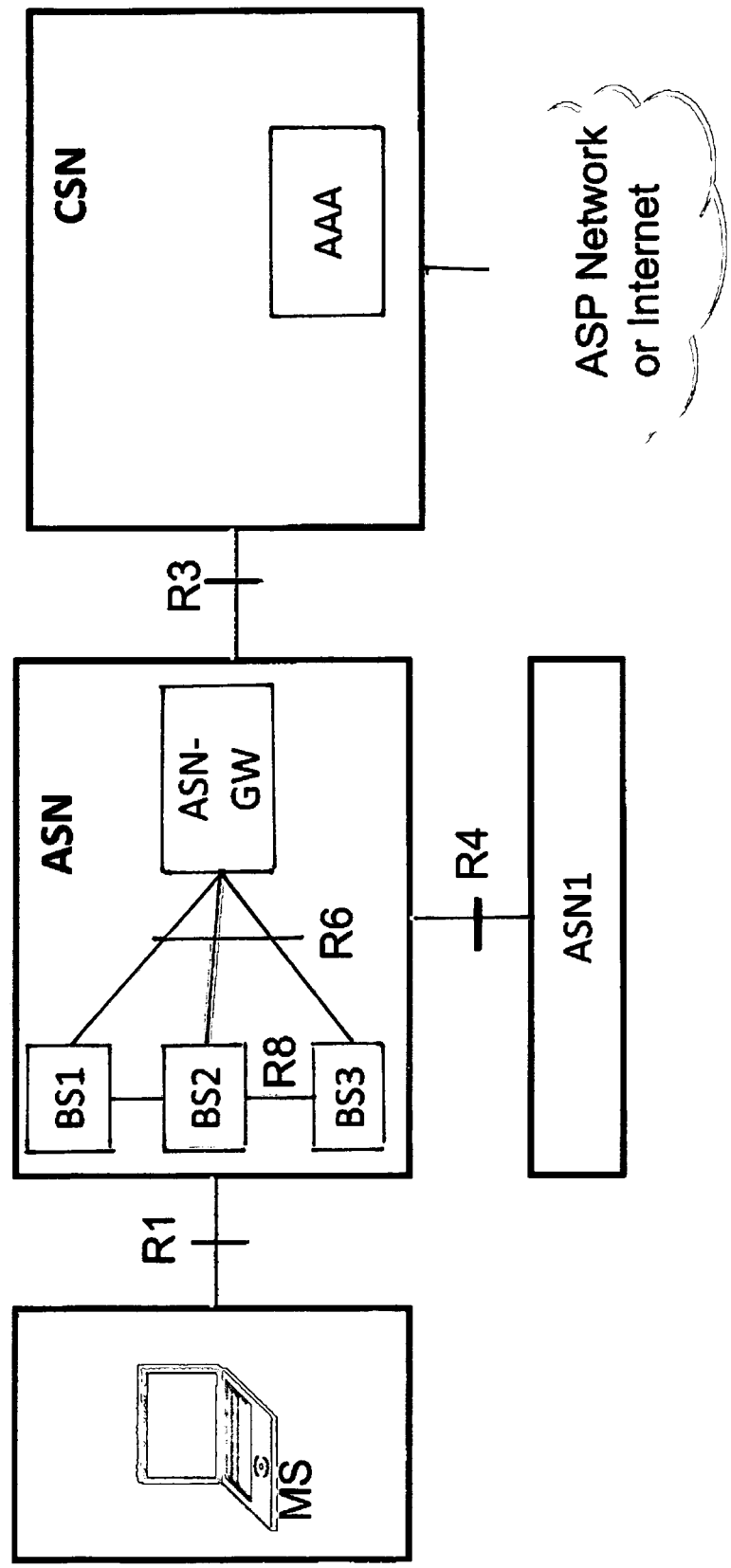

METHOD OF PROTECTING AN IDENTITY OF A MOBILE STATION IN A COMMUNICATIONS NETWORK

FIELD OF THE INVENTION

The invention generally relates to a method of protecting an identity of a mobile station in a communications network. More particularly, but not exclusively, the invention relates to privacy protection of identity information sent by a mobile device and by a network over a wireless link.

BACKGROUND OF THE INVENTION

In the WiMAX Forum (WMF) Networking group (NWG), the network architecture specifications for mobile broadband networks according to the 802.16 specifications of the IEEE are developed, for example as in [nwg-stage3]. The Release 1.0, Release 1.5 and Release 1.6 network specification releases are based on the 802.16-2009 or earlier specifications of IEEE for a pure radio link.

However, these specifications (both the NWG specifications and the radio specifications of IEEE) do not include means for protecting or hiding the identity of a mobile device or mobile station (MS) that may be in the form of a MAC address.

The radio interface specifications according to the specification 802.16m, which succeed 802.16-2009, provide means to protect the MS identity over the air, that is, between the MS and the base station (BS) in the access network.

The specification 802.16m does not cover any network-side behaviour but rather only the behaviour over the wireless link. However, a typical WiMAX network following [nwg-stage3] consists of a number of different network elements and network functions, so any mechanism that is just described between a mobile device and a base station cannot work in practice. Also, technically it is not obvious how to solve MS identity privacy within the WiMAX network and especially within the access network (ASN) based on the method described above for the radio link. This method, if combined with a network following [nwg-stage3], would break ASN operation, and most likely terminate communication between the mobile station and the network.

In specification 802.16m, the MS when initially entering the network sends an AMSID* to the network in message 1 that is a 48-bit hash value. The BS stores this value and assigns a temporary ID TSTID to the MS that is returned in message 2.

The MS and BS then use the additional TSTID as the MS identity on the radio interface during the EAP authentication procedure in all related layer-2 messages that are exchanged between MS and BS. Also for the radio link authentication and security establishment using the PKMv3 protocol the TSTID is used in addition to the AMSID*.

As soon as the radio link can be encrypted with a successful PKMv3 exchange, the real MS identity AMSID is sent by the MS to the BS and the BS assigns a STID that will be used as MS identifier for all subsequent communication.

In addition, the network will securely verify based on cryptographic methods that the AMSID* used by the MS at the beginning belongs to the same MS with the real AMSID.

The above method does not cover network internal operation. It does not reflect the fact that a WiMAX access network consists of a BS, ASN-GW. Also, it is not considered that the authentication decision for network access is taken by the AAA server that terminates EAP authentication and may need to verify the MS MAC address received in different messages, or may need to verify the received MS MAC address against information stored in the subscription profile.

Furthermore, if implemented as described by 802.16m, the above described procedure would break ASN communication during network entry within the WiMAX ASN across the R6 reference point. According to [nwg-stage3] the control messages across the R6 reference point, which are related to a specific MS, use the MS identity as central identifier. If the MS identifier changes for the MS (AMSID*/TSTID changed to AMSID/STID as described above) this breaks the whole context for the MS and will likely result in the MS not being able to access the network.

Currently there is no specification available or any known method that enables the identity of a mobile station in the specification 802.16m to be hidden in a WiMAX network, especially within the ASN.

Therefore a method is required, whereby the identity and privacy of a mobile station in a WiMAX network may be protected.

SUMMARY OF THE INVENTION

Accordingly, the invention provides a method of hiding an identity of a mobile station in a communications network having an access node and a gateway node. The method includes receiving a first mobile station identifier value at the access node and storing the first value in the access node. A second mobile station identifier value is received, and the second identifier value is correlated with the first identifier value in the access node. The first and second identifier values are sent from the access node to the gateway node over an interface. Then, the first identifier value and the second identifier value are stored in the gateway node and the second identifier value is correlated with the first identifier value in the gateway node.

In this way, MS identity hiding is realised according to 802.16m. This method may be optimally integrated into the existing WiMAX network functionality and therefore minimizes impact on existing networks and products. Furthermore, the method according to the invention avoids ASN control signalling breaks as there is a correlation with the correct mobile station context.

Either the first mobile identifier value or the second mobile identifier value may be temporary identifier values. For example, the first identifier value may be an AMSID* or TSTID value (a temporary value) and the second identifier value may be an AMSID or STID value.

Advantageously, the access node correlates the first identifier value and the second identifier value with a context identifier value, stores the context identifier value in the access node, sends the context identifier value to the gateway node over an interface, and wherein the gateway node stores the context identifier, correlating the first and the second identifier with the context identifier.

Preferably, the access node uses the context identifier value to identify the correct mobile station context information for the mobile station identified by the first and the second identifier in messages sent to and received from the gateway node or another access node.

Furthermore, the gateway node may use the context identifier value to identify the correct mobile station context information for the mobile station identified by the first and the second identifier in messages sent to and received from the access node or another gateway node.

In this way, existing ASN control messages can remain unmodified, by performing specific computation of the context identifier value.

The context identifier value may be derived from the second identifier value.

In one embodiment of the invention, the derivation step is based on a cryptographic hash function that generates a hash value which is used as input to the context identifier value.

Advantageously, the first identifier value and the second identifier value are sent from the access node to the gateway node in the content field of messages exchanged between the access node and the gateway node (or the identifier values may be sent in an entirely new message field).

The first mobile station identifier value, the second mobile station identifier value, and the context identifier value, can be stored in mobile station context information in the access node and the gateway node. The first value, the second value and the context identifier value may be the AMSID*, the AMSID and the R6_Context_ID values, respectively.

In an advantageous embodiment, the method further comprises verifying that the mobile station sending the first identifier value is the same as the mobile station sending the second identifier value. The step of verifying may take place in the gateway node and/or in an AAA server node. In this way, security checks related to the identity of the mobile station can be made possible in the gateway node (e.g. ASN-GW) and also in the AAA server of the operator owning the subscription, which allows for more flexibility than just limiting mobile station identity security checks to the base station.

The invention also provides a communications network. The communications network includes an access node via which a mobile station can access the network, and further includes a gateway node. The access node is configured to receive a first mobile station identifier value from a mobile station wishing to connect with the network, to store the first identifier value, to receive a second mobile station identifier value, to correlate the second identifier value with the first identifier value, and to send the first and second identifier values to the gateway node over an interface. The gateway node is configured to store the first identifier value and the second identifier value, and to correlate the second identifier value with the first identifier value.

The invention will now be described, by way of example only, with reference to specific embodiments, and to the accompanying drawings, in which:

BRIEF DESCRIPTION OF THE DRAWINGS

FIG. 1 is a simplified schematic diagram of a communications network in which a method according to the invention may be implemented.

DETAILED DESCRIPTION OF EXEMPLARY EMBODIMENTS

FIG. 1 shows a communications network according to the invention. In this example, the communications network is a WiMAX network.

The network includes two main parts; the access service network ASN and the connectivity service network CSN. A mobile station MS (which in this example is a laptop computer but could also be a mobile telephone or PDA, for example) may connect to the network via the ASN over an interface R1. The access service network ASN includes base stations BS1, BS2 and BS3 provided as access nodes, which can interface with the mobile station MS over the interface R1. Of course, in reality, the network may include more base stations but only three are shown here for simplicity. The access service network ASN may also interface with another access service network ASN1 over an interface R4.

The base stations BS1, BS2 and BS3 are interfaced with each other via an interface R8. Each of the base stations BS1, BS2 and BS3 is then interfaced with a gateway node ASN-GW over an interface R6 (the base station BS1, BS2, BS3 communicates with the gateway node ASN-GW using context messages sent over the R6 interface. The gateway node ASN-GW is interfaced with the connectivity service network CSN over an interface R3. The connectivity service network CSN includes a AAA server AAA for security verification and is connected to an ASP network or the Internet.

The procedure for hiding the identity of the mobile station MS according to the invention when it is connected to the network via the base station BS1 (for example—it could also connect via BS2 or BS3) is as follows:

The mobile station MS sends a AAI_RNG_Req message to the base station BS1. Upon receipt of the AAI_RNG_Req message from the mobile station MS, the base station BS1 learns an identifier value A from the mobile station MS that can be any value chosen by this mobile station MS (A is assumed to be an AMSID* value formed according to the rules identified by 802.16m with 48 bit length in this example). The base station BS1 stores this value A as part of this specific mobile station MS and chooses a second value B as additional temporary identifier for the mobile station MS.

This value is returned in the TSTID field in the AAI_RNG_Rsp message to the mobile station MS.

The base station BS1 correlates the value B with the R6_Context_ID value that the base station BS1 uses for this mobile station MS for messages sent across the R6 and R4 reference points to the gateway node ASN-GW.

In a first embodiment of the invention, binding of the value B to the R6_context_ID value takes place by setting the value B to a value that is equal to a part of the R6_Context_ID value, for example the leftmost 12 bit of the R6_Context_ID.

In a second embodiment of the invention, binding takes place by calculating the value B as a hash value of the R6_Context_ID truncated to the length of B: B=HMAC (R6_Context_ID, other_params), where other_params may include the base station identity, the network identity, random, etc. The hash function may be a keyed hash (HMAC) where the key may be a random value internally generated in the base station BS1.

In a third embodiment of the invention, binding takes place by generating the R6_Context_ID in the base station BS1 such that it either equals or contains the value B and/or the other identifier value A, or it is calculated, for example, by using a hash or HMAC calculated over the identifier values A and/or B and possible additional parameters like the identity of the BS, ASN_GW, Access network, Nonces, etc.

In a fourth embodiment of the invention, binding takes place as follows. The base station BS1 chooses the R6_Context_ID and the identifier value B independently, but creates an internal binding between the AMSID* and R6_Context_ID as part of the context information for this mobile station MS (MS Context).

In addition, when the identifier value B is bound to the R6_Context_ID, the base station BS1 may send the TSTID and/or AMSID* values to the gateway node ASN-GW within the content portion of an R6/R4 control message. This can happen explicitly by extending the access service network ASN (R4/R6/R8 reference points) control messages by a new TLV data field carrying those values, or the ASN-GW can learn these values from the R6_Context_ID value.

The ASN-GW stores these values (R6_Context_ID, AMSID*, and possibly TSTID) in the MS context information (the data kept for this specific session of this mobile station MS) with the WiMAX network) and can create an internal binding between the R6_Context_ID and the AMSID* and/or TSTID as part of the MS context.

The R6_Context_ID is used as the main identifier for the MS context and for relating all ASN control messages to the MS context for this MS. In addition, the AMSID* can be used as an identifier of the mobile station.

For all ASN control messages exchanged for the specific mobile station MS where the wireless link (R1 reference point) is already protected (starting with message 14 in FIG. 3), the base station BS1 and gateway node ASN-GW continue to use the same R6_Context_ID. This is used as the unique identifier for the MS context in the network, although the identity of the mobile station MS used in ASN control messages may change (from AMSID*/TSTID to AMSID/STID).

The gateway node ASN-GW and base station BS1 store the AMSID in the MS context information that also contains the R6_Context_Identifier.

The gateway node ASN-GW verifies (instead of or in addition to the base station BS1), based on a received NONCE_MS value, whether the AMSID* for this MS context matches the real identity AMSID of the mobile station MS. The results of this verification are then used to decide whether or not to grant access to the network, or for routing decisions, for example selecting the correct CSN or server AAA in the CSN to handle the mobile station MS.

The gateway node ASN-GW sends the AMSID value and the AMSID* value for the mobile station MS to the AAA server to allow the AAA server to use the identifier of the mobile station MS as input to the AAA server security verification. Based on this security verification, it can be decided whether or not to grant access to the network resources for the mobile station MS.

Although the invention has been described hereinabove with reference to specific embodiments, it is not limited to these embodiments, and no doubt further alternatives will occur to the skilled person which lie within the scope of the invention as claimed.

For example, instead of using the R6_Context_ID to carry the identifier values of the mobile station MS, any newly defined parameter could be used as long as this has the same properties and function as described above. (i.e., instead of reusing the existing R6_context_ID the value could be carried in a new TLV, e.g. 'MS_Context_ID').

The invention claimed is:

1. A method of hiding an identity of a mobile station in a communications network having an access node and a gateway node, the method comprising receiving a first mobile station identifier value at the access node, storing the first value in the access node, receiving a second mobile station identifier value, correlating the second identifier value with the first identifier value in the access node, sending the first and second identifier values from the access node to the gateway node over an interface, storing the first identifier value and the second identifier value in the gateway node, and correlating the second identifier value with the first identifier value in the gateway node, wherein the access node correlates the first identifier value and the second identifier value with a context identifier value.

2. The method according to claim 1, wherein the access node stores the context identifier value in the access node, sends the context identifier value to the gateway node over an interface, and wherein the gateway node stores the context identifier, correlating the first and the second identifier with the context identifier.

3. The method according to claim 2, wherein the access node uses the context identifier value to identify the correct mobile station context information for the mobile station identified by the first and the second identifier in messages sent to and received from the gateway node.

4. The method according to claim 3, wherein the gateway node uses the context identifier value to identify the correct mobile station context information for the mobile station identified by the first and the second identifier in messages sent to and received from the access node.

5. The method according to claim 1, wherein the context identifier value is derived from the first or the second identifier value.

6. The method according to claim 5 where the derivation step is based on a cryptographic hash function that generates a hash value which is used as input to the context identifier value.

7. The method according to claim 1, wherein the first identifier value and the second identifier value are sent from the access node to the gateway node in the content field of messages exchanged between the access node and the gateway node.

8. The method according to claim 1, wherein the first mobile station identifier value, the second mobile station identifier value, and the context identifier value, are stored in mobile station context information in the access node and the gateway node.

9. The method according to claim 8, further comprising verifying that the mobile station sending the first identifier value is the same as the mobile station sending the second identifier value.

10. The method according to claim 9, wherein the step of verifying takes place in the gateway node.

11. The method according to claim 9, wherein the step of verifying takes place in an AAA server node.

12. A communications network, comprising an access node via which a mobile station can access the network and a gateway node, wherein the access node is configured to receive a first mobile station identifier value from a mobile station wishing to connect with the network, to store the first identifier value, to receive a second mobile station identifier value, to correlate the second identifier value with the first identifier value with a context identifier value, and to send the first and second identifier values to the gateway node over an interface, and wherein the gateway node is configured to store the first identifier value and the second temporary identifier value, and to correlate the second identifier value with the first identifier value.

13. A method of hiding an identity of a mobile station in a communications network having an access node and a gateway node, the method comprising receiving a first mobile station identifier value at the access node, storing the first value in the access node, receiving a second mobile station identifier value, correlating the second identifier value with the first identifier value in the access node, sending the first and second identifier values from the access node to the gateway node over an interface, storing the first identifier value and the second identifier value in the gateway node, and correlating the second identifier value with the first identifier value in the gateway node, wherein the access node correlates the first identifier value and the second identifier value with a context identifier value and uses the context identifier value to identify the correct mobile station context information for the mobile station identified by the first and the second identifier in messages sent to and received from the access node.

14. The method of claim 1, wherein the identity of the mobile station is a MAC address of the mobile station.

* * * * *